(12) United States Patent
Popovich et al.

(10) Patent No.: US 12,124,416 B1
(45) Date of Patent: Oct. 22, 2024

(54) RESOLVING NAMESPACE COLLISIONS DURING FILESYSTEM INCREMENTAL REPLICATION

(71) Applicant: Dell Products L.P., Round Rock, TX (US)

(72) Inventors: Evgeny Popovich, Port Coquitlam (CA); Oliver Chung, Bellevue, WA (US); Smitha Jaya Shankar, Seattle, WA (US); Austin Voecks, Bainbridge Island, WA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/194,668

(22) Filed: Apr. 3, 2023

(51) Int. Cl.
| G06F 16/00 | (2019.01) |
| G06F 16/11 | (2019.01) |
| G06F 16/16 | (2019.01) |
| G06F 16/178 | (2019.01) |

(52) U.S. Cl.
CPC .......... *G06F 16/178* (2019.01); *G06F 16/128* (2019.01); *G06F 16/166* (2019.01)

(58) Field of Classification Search
CPC ..... G06F 16/178; G06F 16/128; G06F 16/166
See application file for complete search history.

(56) References Cited

U.S. PATENT DOCUMENTS

| 6,247,139 | B1* | 6/2001 | Walker | G06F 16/10 709/227 |
| 10,951,704 | B1* | 3/2021 | Frank | H04L 67/1095 |
| 2016/0313934 | A1* | 10/2016 | Isherwood | G06F 3/0619 |
| 2017/0149886 | A1 | 5/2017 | Shetty | |
| 2021/0200641 | A1 | 7/2021 | Bafna et al. | |
| 2022/0197944 | A1 | 6/2022 | Kaplingat et al. | |
| 2023/0133361 | A1 | 5/2023 | Shilane et al. | |

OTHER PUBLICATIONS

White, et al. "SyncIQ Version 2 Design" Sep. 20, 2006, 96 pages. https://eos2git.cec.lab.emc.com/powerscale/tech-doc/blob/master/DDD/synciq/vNone/primer/design.pdf.

Unknown, "SyncIQ Design (Partially updated for 3.0)" Feb. 19, 2010, 93 pages. https://eos2git.cec.lab.emc.com/powerscale/tech-doc/blob/master/DDD/synciq/v3.0/design/design.pdf.

Non Final Office Action received for U.S. Appl. No. 18/154,258 dated Feb. 14, 2024, 35 pages.

Notice of Allowance received for U.S. Appl. No. 18/154,258 dated Jul. 3, 2024, 31 pages.

\* cited by examiner

*Primary Examiner* — Alexander Khong
(74) *Attorney, Agent, or Firm* — Amin, Turocy & Watson, LLP

(57) ABSTRACT

The described technology is generally directed towards resolving namespace collisions on a target system when applying incremental changes (e.g., between snapshots) as part of an incremental replication from a source system. Detected changes to a filesystem namespace include file link, directory move and file and directory unlink operations. The changes are processed to recognize and overcome failures and other issues, such as to not process an unlink before a corresponding link, which can otherwise result in accidental deletion of a file. Deferred operations are maintained for later processing, including deferred directory moves for directory rename failures, deferred unlink operations and name collision fixes. After initial processing, the deferred move list is iteratively processed to overcome directory rename failures, the deferred unlink list is processed after performing corresponding link operations, and the name fix list is processed to rename previously colliding names.

20 Claims, 14 Drawing Sheets

RESOLVING NAMESPACE COLLISIONS DURING FILESYSTEM INCREMENTAL REPLICATION

BACKGROUND

Various file-based storage systems implement data copy/replication to other systems with a baseline (full) copy followed by periodic incremental copies of changes made to the data for efficient dataset transfer. Such incremental copies require changeset detection between two points in time. A point-in-time representation of a file system is often captured using a filesystem's "snapshots" feature. A snapshot provides a powerful mechanism to browse and access the state of a file system captured at a certain point in time.

However, snapshots do not provide any direct and efficient mechanisms for the detection of newly added, removed, linked, unlinked, and renamed files and directories. Other existing technologies are able to detect such namespace changes in a snapshots-based filesystem, however there are issues that arise when those namespace changes are applied to a target system in an incremental replication. For example, in many scenarios conditions, namespace collisions occur when attempting to apply the changes.

Attempted solutions (originally, workarounds) to namespace collisions included using a single temp directory located in the root directory of the target. Whenever an operation did not succeed, the operation was linked into the temp directory instead and resolved later when the condition was fixed. This resulted in several major issues, including that the temp directory became single point of contention in the replication, where in certain circumstances, many workers were attempting to link and unlink things simultaneously. This caused performance issues (such as namespace contention, multi-locker ping pong and the like) in that directory. Usage of a single temp directory at the root of the target also caused interaction issues with other features that could be present, such as WORM or Quotas, that enforced restrictions on what could be moved into or out of a directory.

Thus, another workaround was to create multiple temp directories using a hash to determine how to spread out the load over multiple temp directories. This added an extra layer of indirection/complexity to determine which temp directory to access and also a lot of file descriptors to keep open, as well as introducing multiple entire trees of temp directories. Further, a complicated algorithm to reverse-tree walk/move a directory one item at a time was used in order to bypass this restriction, but in practice, the code complexity resulted in significant escalations/failures.

BRIEF DESCRIPTION OF THE DRAWINGS

The technology described herein is illustrated by way of example and not limited in the accompanying figures in which like reference numerals indicate similar elements and in which.

DETAILED DESCRIPTION

The technology described herein is generally directed towards resolving namespace collisions on a target system when applying incremental changes as part of an incremental namespace replication. The technology described herein overcomes namespace-related issues that otherwise arise in incremental namespace replication, including, for example, failed directory moves resulting from directories' parent-child relationships being reversed prior to the incremental replication, wrongly unlinked files that occur an "unlink" operation is processed before a corresponding "link" operation, and failed "file link" or "file/directory create" operations because the target still contains stale files/directories that still need to be unlinked/moved, but the unlink/move has not yet been processed.

It should be understood that any of the examples herein are non-limiting. As one example, the technology is generally described herein in a distributed node cluster environment, however this is only an example, and the technology can be implemented in similar environments. As another example, the replication described herein uses a snapshot (representing a point-in-time state) of a source cluster filesystem for incrementally transferring data to a target cluster system, however other systems can use similar concepts. Thus, any of the embodiments, aspects, concepts, structures, functionalities or examples described herein are non-limiting, and the technology may be used in various ways that provide benefits and advantages in data storage and computing in general.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations. For example, unless otherwise noted the order of some example operations described with reference to the flow diagrams can be modified from the example ordering described herein.

One or more embodiments subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
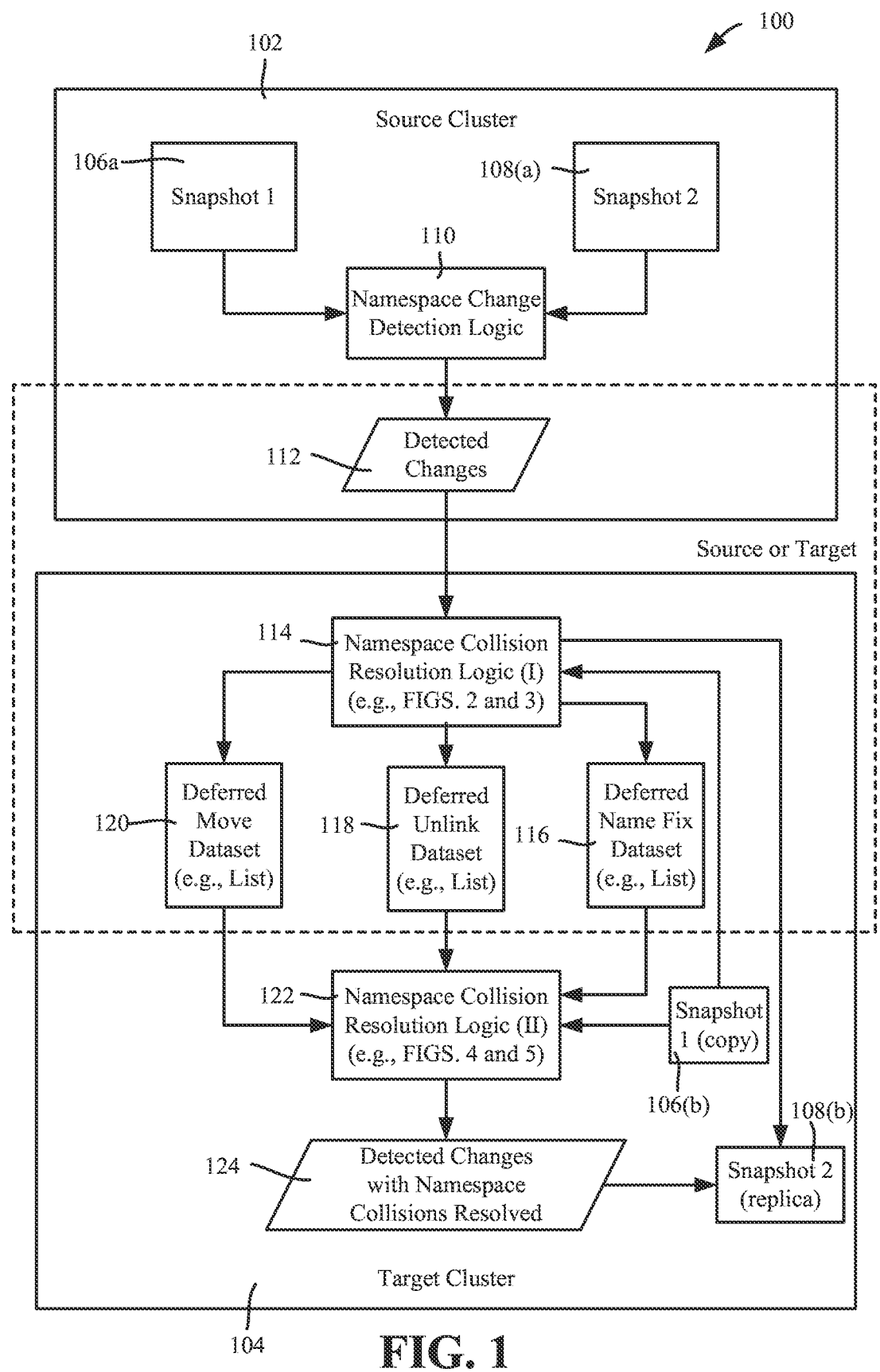
FIG. 1 is a block diagram of an example source cluster and target cluster in which incremental replication of a filesystem namespace of the source cluster to the target cluster is accomplished, in accordance with various aspects and implementations of the subject disclosure.

FIG. 1 is a block diagram of an example system 100 in which incremental replication occurs from a source cluster 102 to a target cluster 104 (clusters of nodes). In this example, the source cluster has a snapshot 106a (Snapshot 1) of a filesystem ("fs/") or other namespace (such as part of a larger filesystem) in accordance with one or more embodiments described herein. Consider that changes to the namespace have been made to the source cluster, and incremental replication is thus desired. A snapshot 108a (Snapshot 2) is taken of the namespace in the updated state to be replicated. This typically corresponds to the most recent updates, although it is feasible for incremental changes to be based on older updates between one snapshot and another.

In this example, the target cluster 104 has, via a previous full or incremental replication, a replica of the namespace from which a snapshot 106b has been taken. Prior to incremental replication, the source cluster 102 and the target cluster 104 thus have basically identical snapshot copies 106(a) and 106(b). This typically corresponds to a prior, most recent full or incremental replication, although it is feasible to be copies of another pair of snapshots in time. In any event, the target cluster 104 is to update its replica namespace with the source updates, which it can do by incrementally updating the snapshot 106(b) copy to a snapshot 108(b) replica.

Thus, in one implementation, the source filesystem to be incrementally replicated is a snapshot of a filesystem (or namespace part thereof) that has captured the state of the filesystem at a certain point in time and after updates captured at a later point in time; in this way, the actual namespace of files and directories can continue to be accessed/modified by client users after the snapshot times. Alternatives to snapshots can be used in other systems.

There are various ways to detect changes to files and directories, e.g., between snapshots, such as described in U.S. patent application Ser. No. 18/154,258. With the technology described therein, namespace change detection component or the like (namespace change detection logic 110 in this example) compares a first representation of a file system (e.g., the first snapshot 106a) with a second representation of the file system, (e.g., the second snapshot 108(a)). The comparison results in an output of detected changes (changes 112 in this example) including identifiers of changed files and changed directories. In one example, determining the namespace changes is based on advancing respective pointers through respective directory entry hash values associated with the respective representations, and identifying non-identical hash values indicative of changes. The types of the namespace changes are then determined, e.g., a moved type associated with moved directory entries, as well as newly added types and removed types.

Replicating via these detected changes 112 often results in one or more various namespace-related issues, which are almost certain to occur with namespace-heavy customer datasets (e.g., on the order of billions of small files). Such issues, if not dealt with, include failed directory moves caused by an old directory path being an ancestor of a new directory path (e.g., the parent-child relationship of two directories has been reversed in the newer snapshot), or because files can be incorrectly unlinked if an "unlink" operation is processed before the counterpart "link" operation. There can be failed "file link" or "file/directory create" operations in the event that the target still contains stale files/directories that still need to be unlinked/moved, but the unlink/move has not been processed yet. Name collisions also can occur.

In contrast to temporary directory(ies) workarounds, the technology described herein processes the detected changes 112 to resolve these issues prior to or as part of applying the detected changes 112 to produce the updated snapshot replica 108(b). The detected changes 112 can be processed at the source system 102 to an extent, and/or at the target system 104 in one example implementation.

Figure 2:
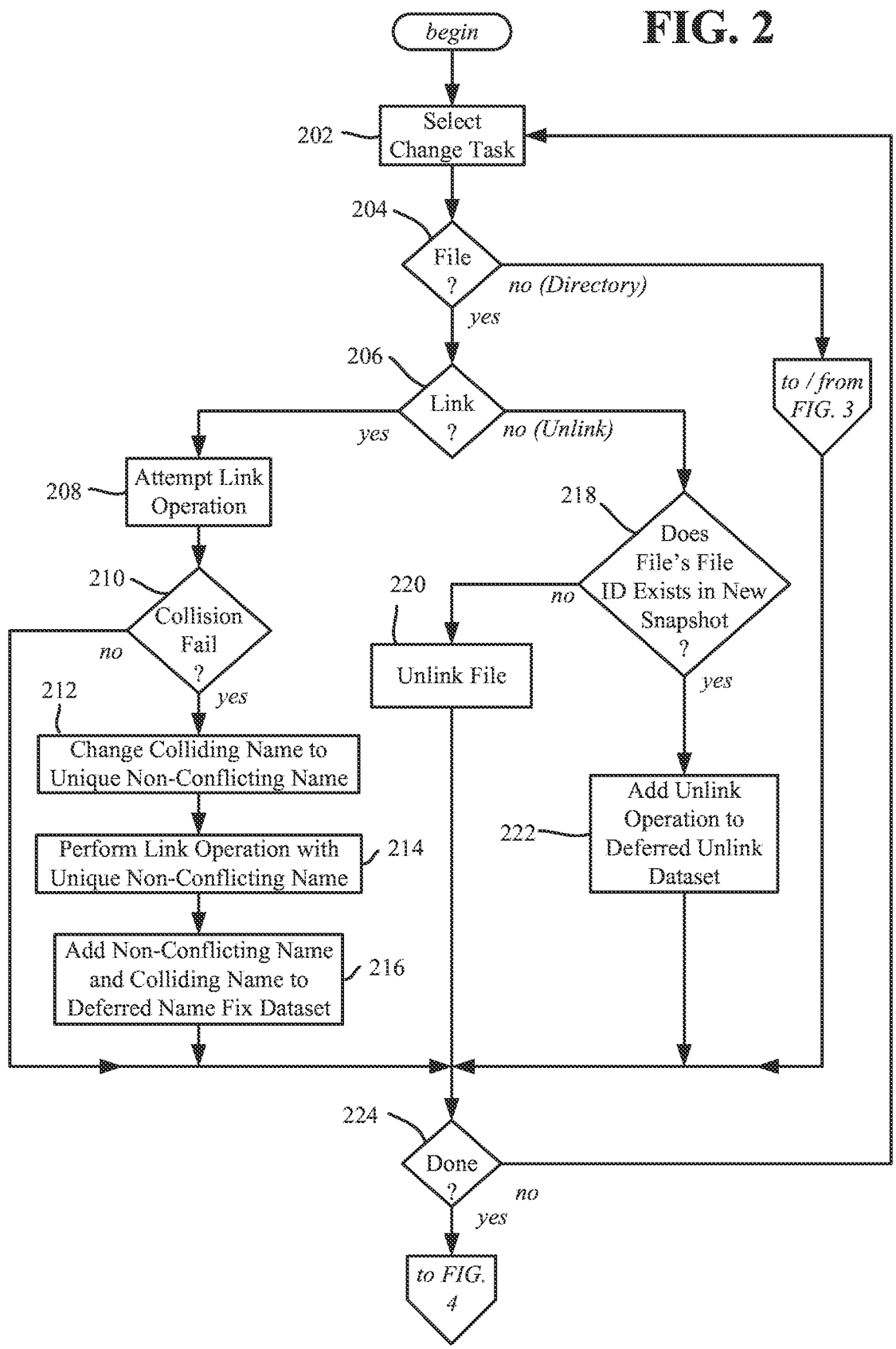
FIG. 2 is a flow diagram of example operations with respect to a file-related incremental change task for handling file link or unlink operations, in accordance with various aspects and implementations of the subject disclosure.

In FIG. 1, a first part of namespace collision resolution logic 114 processes the detected changes 112 as generally described with reference to FIGS. 2 and 3. Such changes include link, unlink, and rename (directory move) operations in one example implementation. Note that the source cluster 102 or the target cluster 104 can perform at least some of the operations of FIGS. 2 and 3.

With respect to file system link, unlink, and rename operations, it should be noted that because a file's linkage can change drastically between two snapshots (e.g., from X to Y links in completely different directories), it is not possible to determine if a file was moved a number of times or not, and exactly how many new links added/older links removed; (this information is not tracked). Thus, to simplify file handling, the namespace changes of files are handled using only link and unlink filesystem operations, that is, no rename operations are done for files; (atomic link and unlink basically accomplish a rename).

By way of example, consider that operation 202 selects a change task from the detected changes 112. If, at operation 204 the task is for a file, operation 206 evaluates whether the change is a link operation. If so, operation 208 attempts the link operation. A link (as well as a rename) can fail if the target directory for a link still contains the same name on the target system, (and should be unlinked as part of a subsequent change), in which event there is a name collision situation as evaluated by operation 210. If there is no failure, operation 210 branches to operation 224 to select the next change task for processing, until none remain.

In the scenario of a name collision, at operation 212 a new unique and non-conflicting file name is created instead of the original one for the link being executed. Operation 214 performs the link operation with the unique non-conflicting name (whereby there is no link failure) at operation 214. At operation 216, a "name fix" operation is recorded in a deferred name fix dataset, e.g., a list, shown via block 116 of FIG. 1.

Returning to operation 206, consider that instead of a link, the task was an unlink operation; if so, operation 206 branches to operation 218. An unlink operation cannot fail, but cannot be executed immediately, because if an unlink change is detected for a file and processed before a corresponding link operation is reached in the detected changes 112, a file can be accidentally deleted on the target. To avoid this situation, operation 218 evaluates whether the file still exists in the new snapshot. If the file does not exist in the new snapshot, the file can be unlinked (operation 220). Otherwise, to avoid accidental deletion, a file unlink operation in which the file exists in both the older snapshot and the newer snapshot is added to a deferred unlink dataset by operation 222, e.g., a list, shown via block 118 of FIG. 1.

Figure 3:
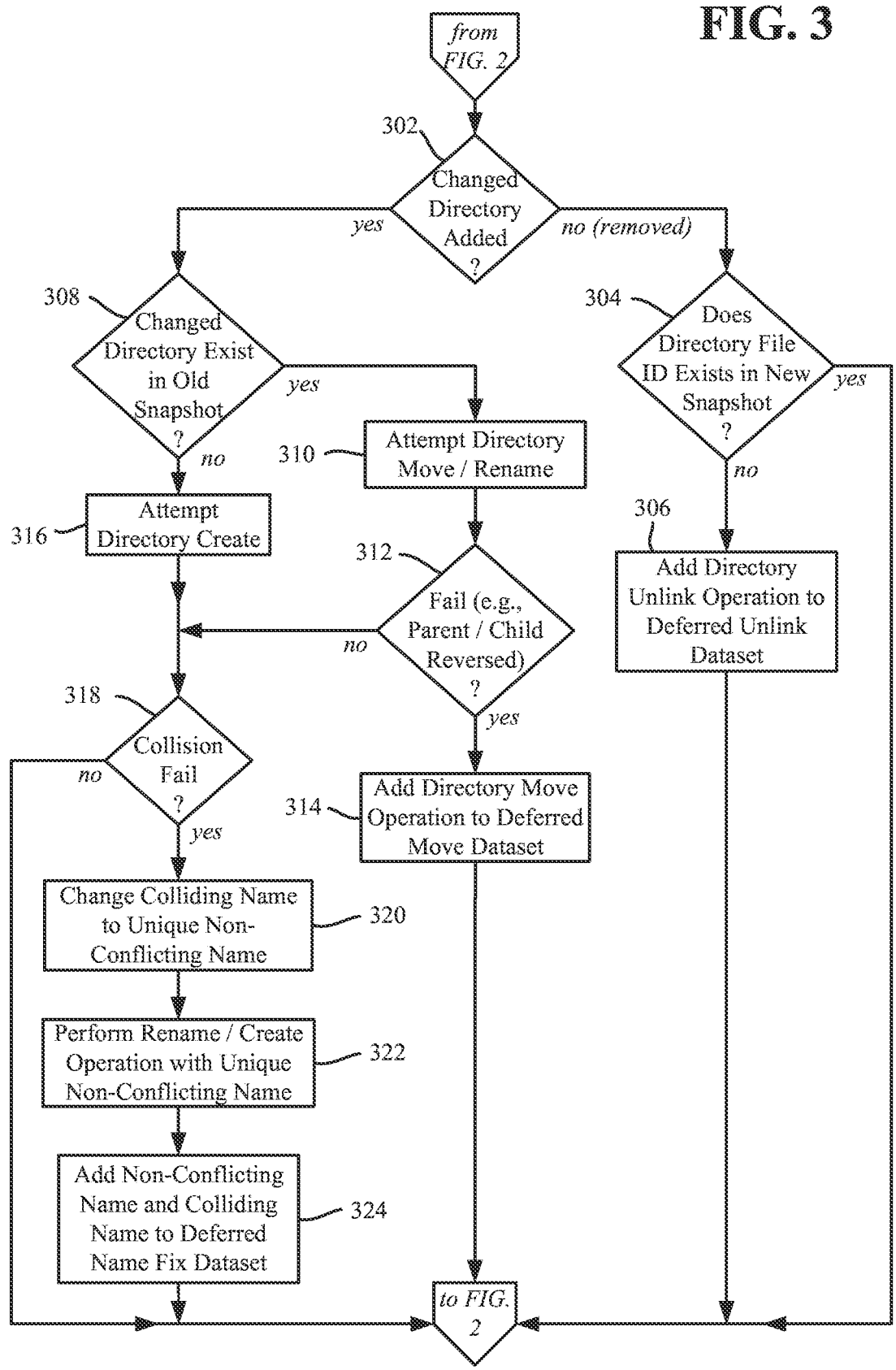
FIG. 3 is a flow diagram of example operations with respect to a directory-related incremental change task for handling directory move or unlink operations, in accordance with various aspects and implementations of the subject disclosure.

Returning to operation 204, consider instead that the selected change task is for a directory, in which event the process continues at FIG. 3, operation 302. Note that directories cannot have multiple hard links in most filesystems, including the example filesystem described herein. Hence, in contrast to files, an existing directory namespace change can be made either by an unlink operation or a move operation.

The operation to perform is based on whether the changed directory was added or removed, as evaluated at operation 302. If removed, operation 304 evaluates whether the file ID exists in the new snapshot, that is, which operation to next perform is determined based on whether the directory's file ID exists in the new snapshot. If not, as shown via operation 306, the directory unlink operation is added to the deferred unlink dataset. This is because if "Unlink Directory" is executed before the necessary "file link" operations, the system could unlink the last link of a file, which would accidentally delete the file; (that is, to avoid is unlinking a directory that contains files that might be linked elsewhere later, e.g., the last link of a file can be contained within the directory to be unlinked and may still exist in the new snapshot). If instead operation 304 determines that the directory file ID exists in the new snapshot, there is no need to do anything with this directory, as this directory operation will be handled by the move on target directory.

Returning to operation 302 for when the changed directory was instead added, operation 302 branches to operation 308 to determine whether the directory file ID exists in both the old and the new snapshots on the source system. If yes, a move/rename operation is attempted at operation 310. A directory rename operation can fail when the old directory path is an ancestor of the new directory path (e.g., with EINVAL on POSIX systems). This usually occurs whenever attempting to move a parent directory into a child, which would cause a loop and detach it from the directory tree. A more specific example of this is if the order of parent/child directories are reversed, such as /fs/a/b/c changing to /fs/c/b/a in a subsequent snapshot. In this situation, the rename operation is added by operations 312 and 314 to a deferred move dataset, e.g., a list, shown via block 120 of FIG. 1. Otherwise operation 312 branches to operation 318 to determine whether a name collision failure occurred, as described below.

If instead operation 308 determined that the directory file ID did not exist in the old snapshot, but exists in new snapshot, a directory create operation is attempted at operation 316. A directory create operation also can fail (similar to a link operation) if the target directory for a create still contains the same name on the target system (and should be renamed or unlinked as part of subsequent changes), whereby there is a name collision situation. If the target directory for the create still contains the same name on the target system, there is a name collision situation as detected by operation 318. In this scenario, at operation 320 a new unique and non-conflicting directory name is created instead of the original one for the link being executed. Operation 322 performs the create operation with the unique non-conflicting name (whereby there is no creation failure). At operation 324, a "name fix" operation is recorded in a deferred name fix dataset, e.g., a list, shown via block 116 of FIG. 1.

As described with reference to FIGS. 2 and 3, the first phase of the namespace collision resolution logic 114 of FIG. 1 typically results in three deferred execution datasets, namely the deferred name fix dataset 116, the deferred unlink dataset 118, and the deferred move dataset 120. The operations in these lists are executed as a next phase of the incremental replication process, after the namespace detection changes 112 have been processed as described herein.

Consideration needs to be given to the order of processing the deferred execution datasets. First, operations in the deferred move list are executed (as described with reference to FIG. 4). Next, as described with reference to FIG. 5, unlink list operations are executed, followed by the name fix operations being executed. The reasoning behind the order is that deferred move operations need to happen before deferred unlink operations unlink for directories to prevent accidental deletion of a directory out. For example, assume snapshot1 has dir_a/dir_b/{dir_c,file_a}. If dir_b is unlinked, but before that happens, dir_c is moved out and dir_a is moved under dir_c, with the final state: dir_c/dir_a, processing unlink for dir_b before handling the parent/child relationship swap results in dir_c being deleted by mistake. Further, move operations can generate additional name fix operations, whereby move operations need to occur before name fix operations. Also, unlink operations have to happen before the name fix operations, otherwise, a name fix operation may fail again.

As described with reference to FIG. 3, the deferred move list only contains directories that have failed to rename earlier. As set forth above, this usually occurs whenever attempting to move a parent directory into a child, which would cause a loop and detach it from the directory tree. An example of this is if the order of parent/child directories are reversed, such as /fs/a/b/c changing to /fs/c/b/a in a subsequent snapshot. In this scenario, if the system tries to move directory a into directory b or directory b into directory c, the filesystem detects such an error and returns an EINVAL error or the like. As a result of the attempt to execute this change, operation 310 create deferred move task entries for moving a to b and moving b to c, whereby c will have successfully moved to /fs.

Figure 4:
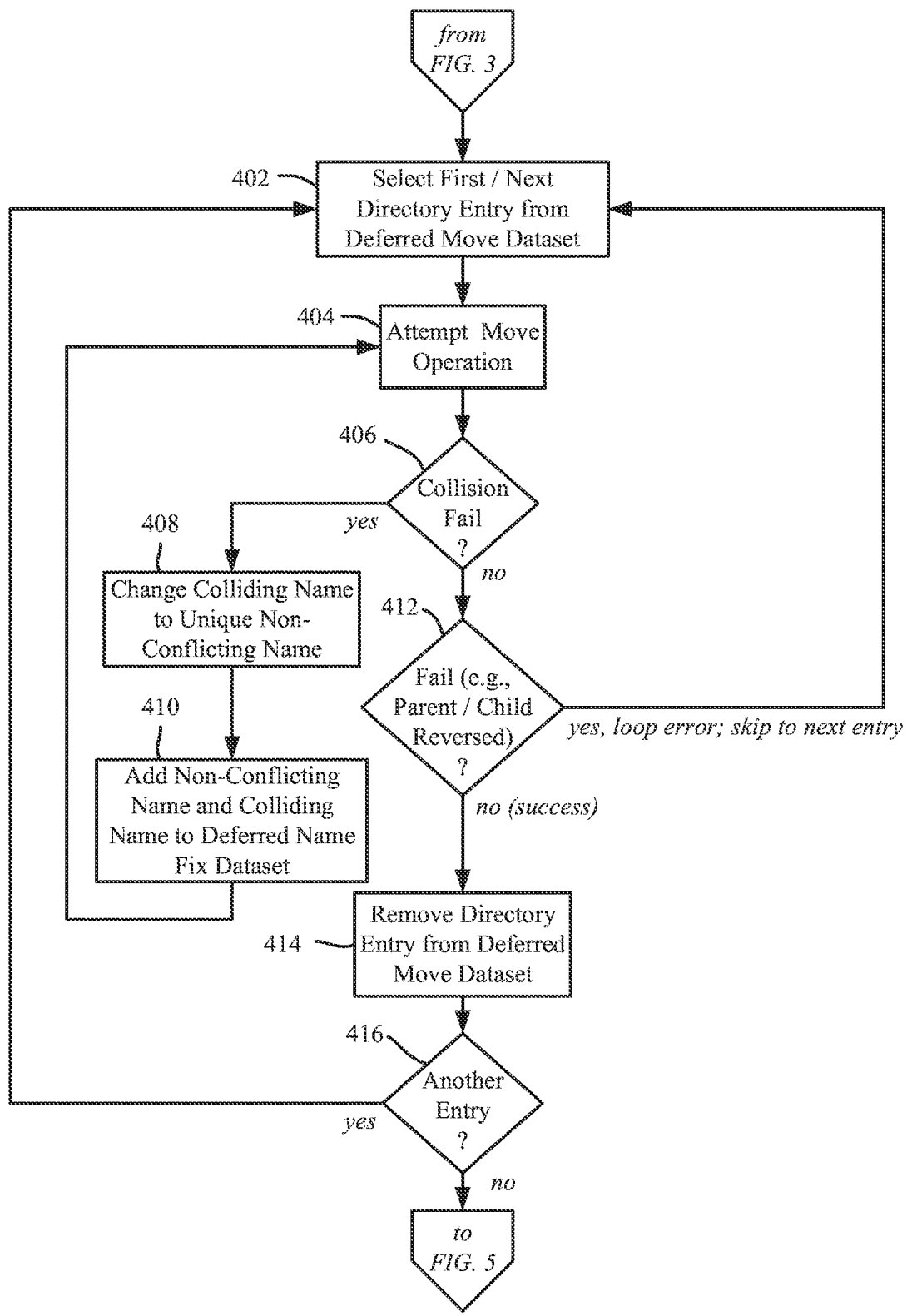
FIG. 4 is a flow diagram of example operations with respect to handling deferred directory move operations, in accordance with various aspects and implementations of the subject disclosure.
Figure 5:
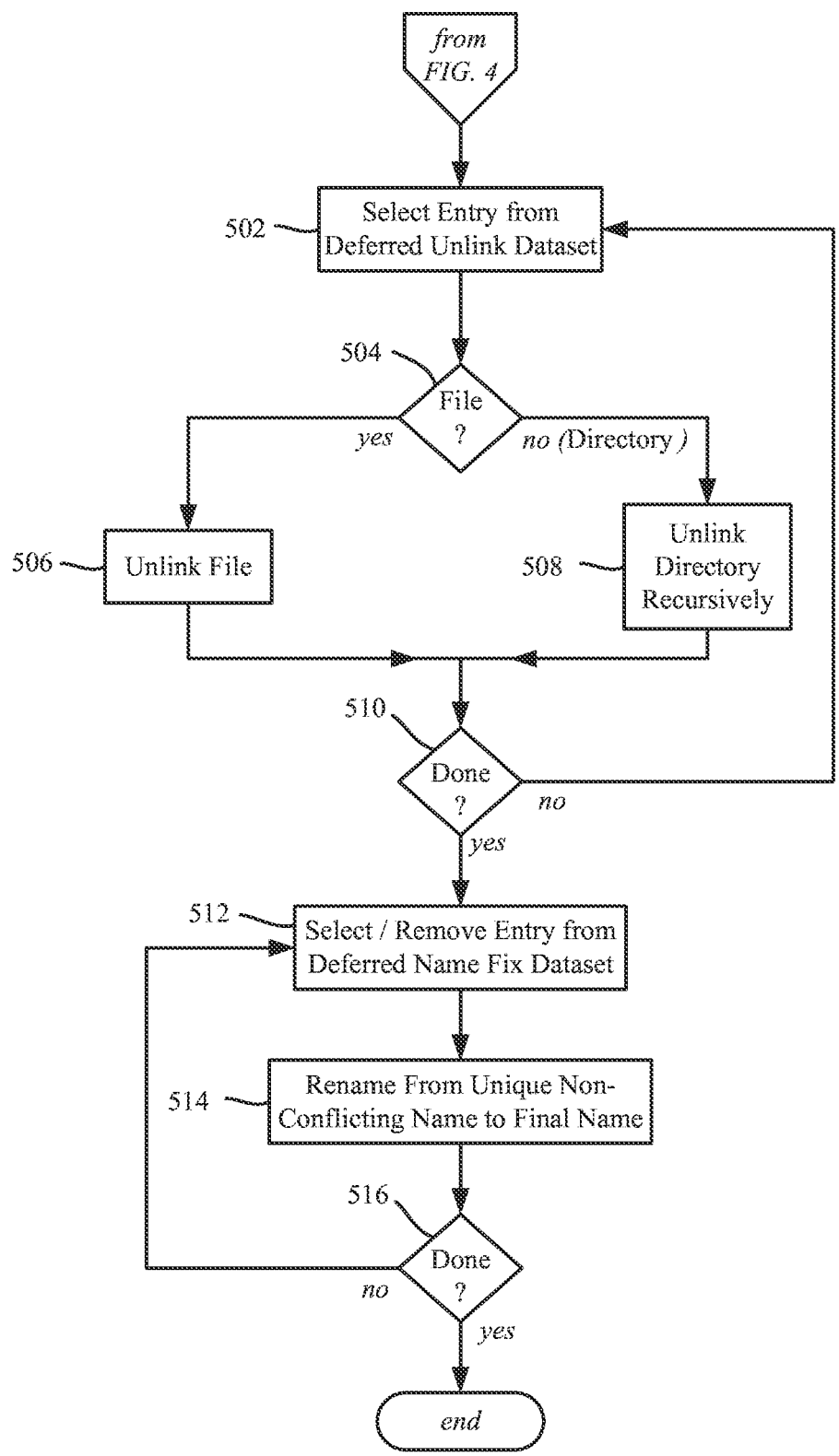
FIG. 5 is a flow diagram of example operations with respect to handling deferred unlink operations and name fix operations, in accordance with various aspects and implementations of the subject disclosure.

To execute the deferred move dataset 120, the second phase of the namespace collision resolution logic (block 122) loops over the entries/move operations until they are complete, as represented in FIG. 4 via operations 402 and 416. Performing rename operations can result in additional name collisions due to directory entries not yet being unlinked, as detected by operation 406. As before in other scenarios, the use of the unique non-conflicting names as described herein and in FIG. 4 via operations 408 and 410 (operation 410 adds the entry to the deferred name fix dataset 116), successfully execute the move when reattempted at operation 404.

The other possible failure with a rename (move) operation can occur as well, namely when the old directory path is an ancestor of the new directory path. In the above example, attempting at operation 404 to move directories a to b fails again because the old directory path is still an ancestor of the new directory path. However, the directory b to c move, when executed in this iteration, does succeed (because directory c was previously moved successfully) and is thus removed (operation 414) from the deferred move dataset. As a result, in the next iteration (repeated via operation 416), the remaining item to move, a to b, also succeeds. Execution in a loop guarantees the eventual resolution of such parent/child move dependencies. Note that removal as described herein can be actual removal of an entry from a list, for example, or virtual removal such as by marking/flagging an entry as having been completed.

The deferred unlink dataset is a group (e.g., list) of the directories and files to be unlinked in association with the corresponding parent from which to unlink. When selected via operation 502 of FIG. 5, files are unlinked directly (operation 506), while directories are unlinked recursively (operation 508); these operations will not cause issues because file link and directory move operations have been previously completed. By performing links before unlinks, accidental deletion of data is prevented on the target (precluding the need to retransfer the data).

Thus, at the point of processing the deferred unlink dataset 118, the links and directory moves have completed. Although operation 510 suggests a loop to select and process each entry, it should be noted that processing of the deferred unlink dataset 118 can be parallelized or executed in the background via any of various techniques, such as work range splitting or the like. Indeed, many of the operations described herein can be parallelized/executed in the background.

The execution of the deferred name fix dataset 116 occurs next, as represented by operations 512 and 514. In this execution, the system executes a rename operation on each item in the list, renaming it from the unique non-conflicting name to the final name. These renames are guaranteed to succeed, because any conflicts will have been previously renamed to the unique non-conflicting name. For example, if /fs/a and /fs/b are renamed to each other ("a" to "b" and "b" to "a"), one of them (e.g., "a to b") would have previously failed the rename (and then chosen a unique name ("a\*\*\*") and added itself to this list), while the other rename (e.g., "b" to "a") will have previously succeeded its rename, that is, prior to operation 514 processing this entry. Executing this list thus fixes the last entry (e.g., "a\*\*\*" to "b", with "b" having been changed to "a") remaining for each rename operation, and resolves the conflicting namespace operation. Operation 516 repeats for each remaining entry, although as set forth herein, at least some parallel processing is feasible.

Figure 6:
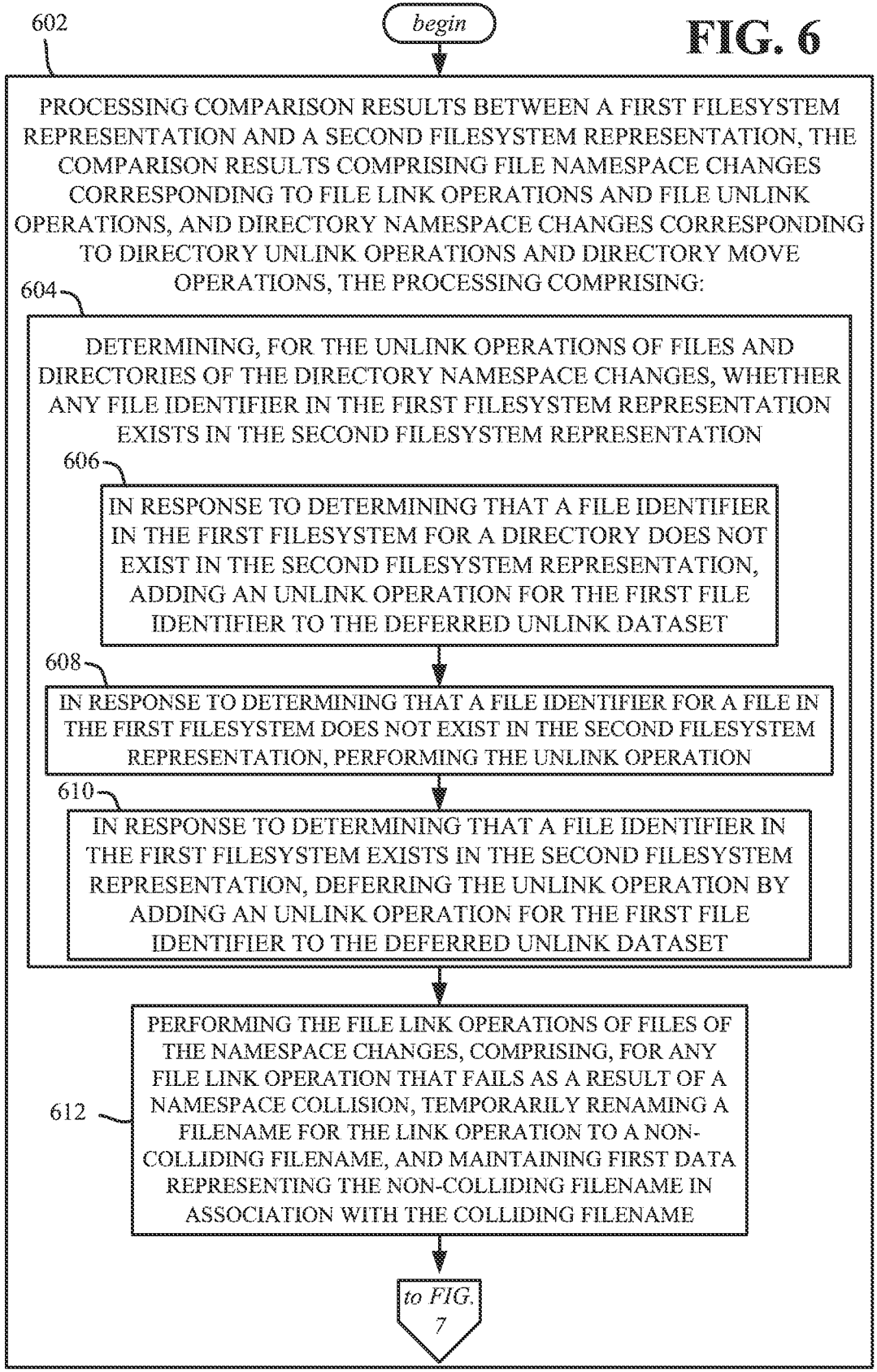
FIGS. 6 and 7 comprise a flow diagram of example operations for handling incremental change tasks for files and directories, including processing deferred tasks, in accordance with various aspects and implementations of the subject disclosure.
Figure 7:
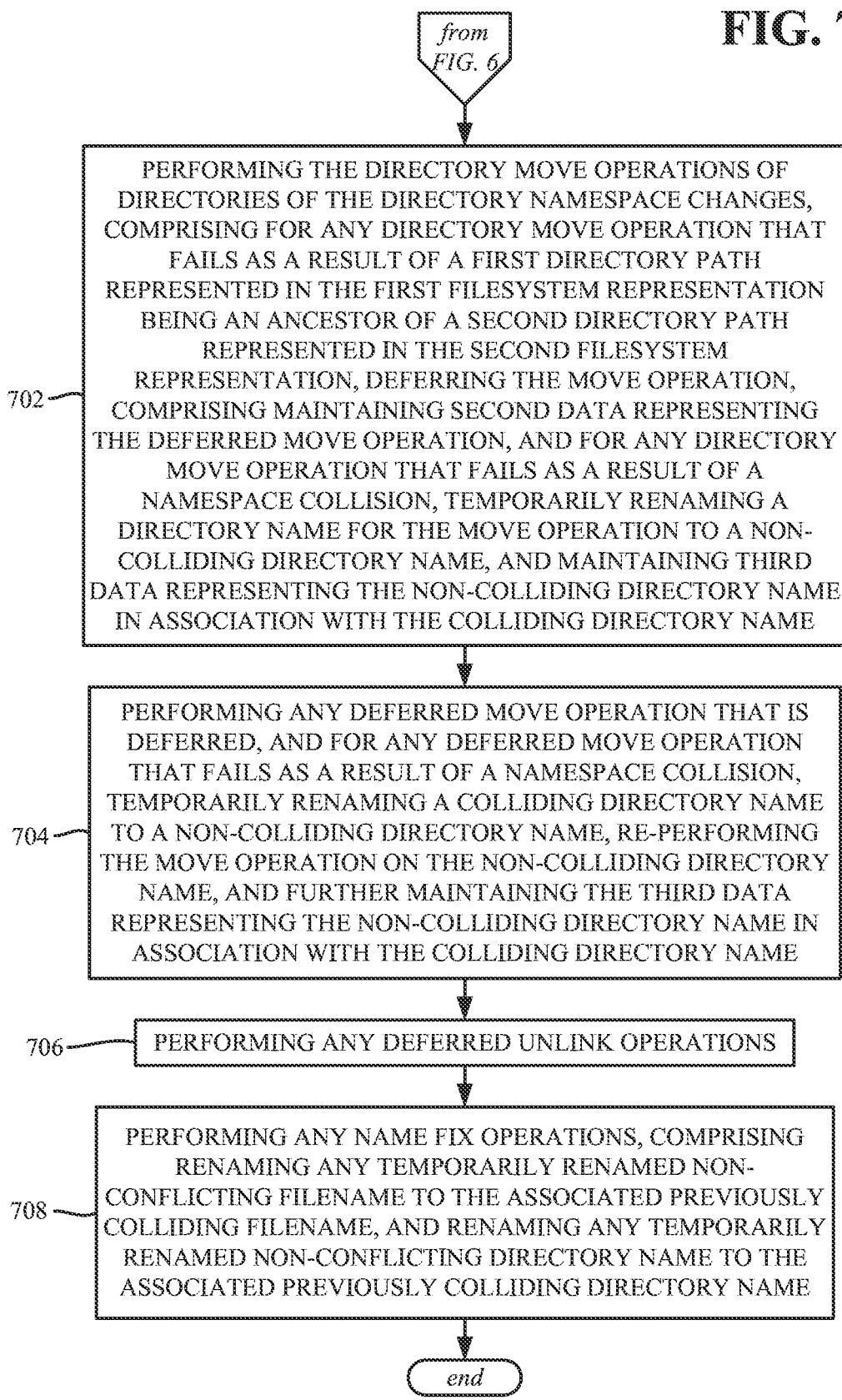

One or more aspects can be embodied in network equipment and/or a system, such as represented in the example operations of FIGS. 6 and 7, and for example can include a memory that stores computer executable components and/or operations, and a processor that executes computer executable components and/or operations stored in the memory. Example operations can include example operation 602, which represents processing comparison results between a first filesystem representation and a second filesystem representation, the comparison results comprising file namespace changes corresponding to file link operations and file unlink operations, and directory namespace changes corresponding to directory unlink operations and directory move operations. The processing can include operations 604-610 of FIG. 6 and operations 702-708 of FIG. 7. Example operation 604 represents determining, for the unlink operations of files and directories of the directory namespace changes, whether any file identifier in the first filesystem representation exists in the second filesystem representation. Example operation 606 represents, in response to determining that a file identifier for a directory in the first filesystem does not exist in the second filesystem representation, adding the unlink operation to the deferred unlink dataset. Example operation 608 represents, in response to determining that a file identifier for a file in the first filesystem does not exist in the second filesystem representation, performing the unlink operation. Example operation 610 represents, in response to determining that a file identifier in the first filesystem exists in the second filesystem representation, deferring the unlink operation, by adding an unlink operation for the first file identifier to the deferred unlink dataset. Example operation 612 represents performing the file link operations of files of the namespace changes, comprising, for any file link operation that fails as a result of a namespace collision, temporarily renaming a filename for the link operation to a non-colliding filename, and maintaining first data representing the non-colliding filename in association with the colliding filename. The processing continues at example operation 702 of FIG. 7, which represents performing the directory move operations of directories of the directory namespace changes, comprising for any directory move operation that fails as a result of a first directory path represented in the first filesystem representation being an ancestor of a second directory path represented in the second filesystem representation, deferring the move operation, comprising maintaining second data representing the deferred move operation, and for any directory move operation that fails as a result of a namespace collision, temporarily renaming a directory name for the move operation to a non-colliding directory name, and maintaining third data representing the non-colliding directory name in association with the colliding directory name. Example operation 704 represents performing any deferred move operation that is deferred, and for any deferred move operation that fails as a result of a namespace collision, temporarily renaming a colliding directory name to a non-colliding directory name, re-performing the move operation on the non-colliding directory name, and further maintaining the third data representing the non-colliding directory name in association with the colliding directory name. Example operation 706 represents performing any deferred unlink operations. Example operation 708 represents performing any name fix operations, comprising renaming any temporarily renamed non-conflicting filename to the associated previously colliding filename, and renaming any temporarily renamed non-conflicting directory name to the associated previously colliding directory name.

Maintaining the second data representing the move operation can include maintaining a deferred move dataset corresponding to any deferred move operation; performing of any deferred move operation that is deferred can include attempting the deferred move operation, in response to the deferred move operation succeeding, removing the deferred move operation from the deferred move dataset, in response to the move operation failing as a result of a first directory path represented in the first filesystem representation being an ancestor of a second directory path represented in the second filesystem representation, skipping over the deferred move operation to leave the deferred move operation in the deferred move dataset, and looping back to reattempt the deferred move operation in a subsequent iteration over the deferred move dataset until no deferred move operations remain to be processed in the deferred move dataset.

The first filesystem representation can represent a source filesystem being in a first state, the second filesystem representation can represent the source filesystem being in a second state, and in which the second state can be an updated state relative to the first state. Changes to the source filesystem corresponding to the second state relative to the first state can be copied via an incremental copy to a target filesystem to update the target filesystem from the first state to the second state.

At least one file identifier for an unlink operation can represent a directory, and at least one other file identifier for an unlink operation can represent a file. Any move operation that is deferred can be performed on the target filesystem, and any unlink operation that is deferred can be performed on the target filesystem.

At least one of: performing the file unlink operations, or performing the directory unlink operations, for any directory that is empty as a result of any move operation, can be performed via at least one of: parallelized operations or multiple background operations.

The first filesystem representation can include a first filesystem snapshot and the second filesystem representation can include a second filesystem snapshot obtained at a later point in time relative to the first snapshot.

The first filesystem representation can represent the filesystem at a first storage cluster, and wherein the second representation can represent the filesystem at a second storage cluster.

Performing any deferred move operation that is deferred can be performed prior to the performing of the file unlink operations and prior to the performing of the directory unlink operations, for any directory that is empty as a result of a move operation.

Performing of any deferred move operation that is deferred can be performed prior to the performing of any of the name fix operations.

Performing the file unlink operations and performing the directory unlink operation for any directory that is empty as a result of any move operation executing on the deferred unlink dataset can be performed prior to the performing of any of the name fix operations.

Performing any deferred move operation that is deferred can be performed prior to the performing of the file unlink operations and prior to the performing of the directory unlink operation for any directory that is empty as a result of any move operation with respect to the deferred name fix dataset, and performing the file unlink operations and the performing of the directory unlink operations, for any directory that is empty as a result of any move operation, can be performed prior to the performing of any of the name fix operations.

Performing the directory unlink operation for any directory that is empty as a result of any move operation can include performing a recursive unlink operation.

Figure 8:
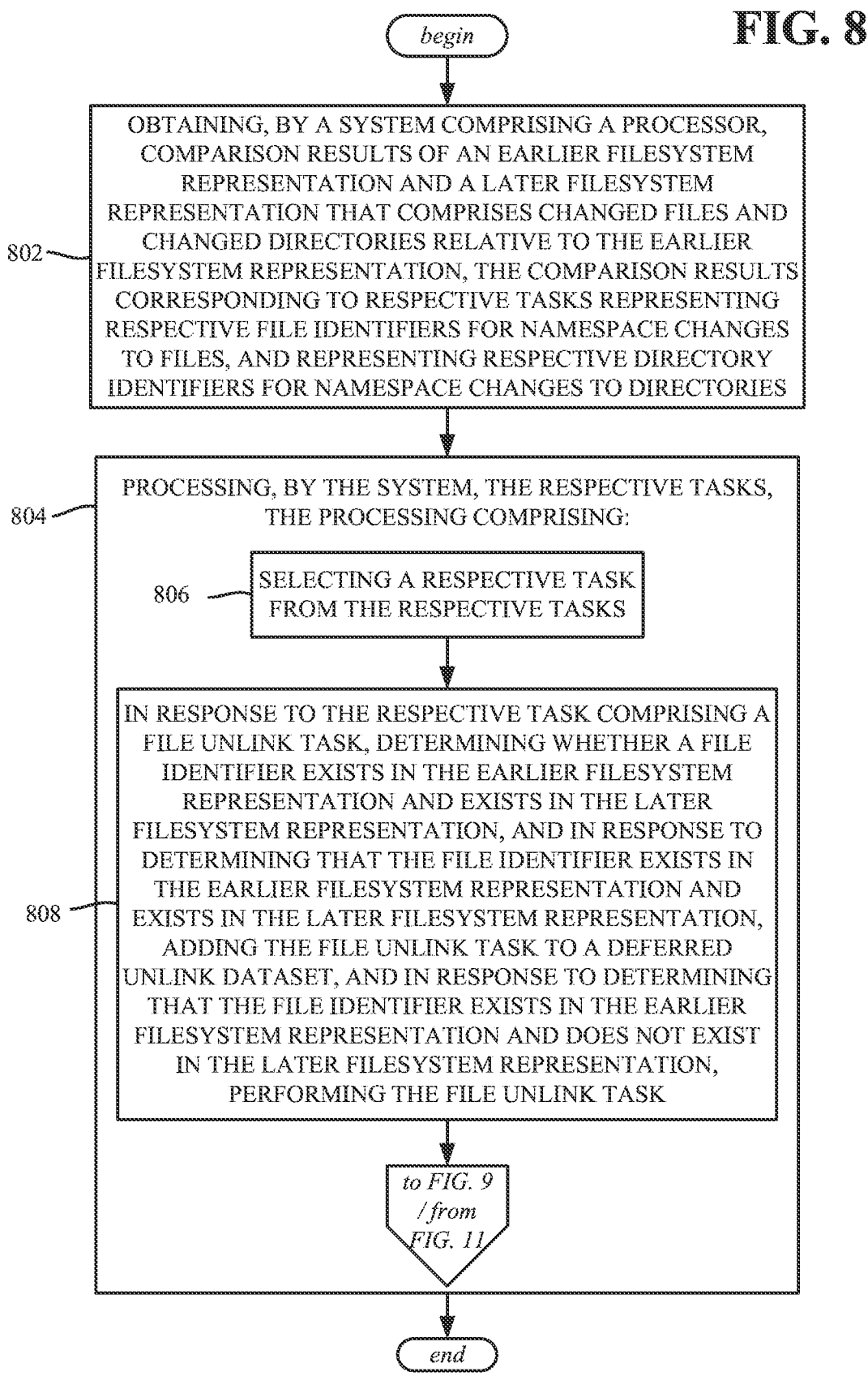
FIGS. 8-11 comprise a flow diagram of example operations for handling comparison results that include incremental change tasks for files and directories, including deferring tasks and later processing the deferred tasks, in accordance with various aspects and implementations of the subject disclosure.

One or more example aspects, such as corresponding to example operations of a method, are represented in FIGS. 8-11. Example operation 802 of FIG. 8 represents obtaining, by a system comprising a processor, comparison results of an earlier filesystem representation and a later filesystem representation that comprises changed files and changed directories relative to the earlier filesystem representation, the comparison results corresponding to respective tasks representing respective file identifiers for namespace changes to files, and representing respective directory identifiers for namespace changes to directories. Example operation 804 represents processing, by the system, the respective tasks, the processing can include operations 806 and 808 of FIG. 8, operations 902-906 of FIG. 9, operations 1002-1014 of FIG. 10, and operations 1102 and 1104 of FIG. 11. Example operation 806 represents selecting a respective task from the respective tasks. Example operation 808 represents, in response to the respective task comprising a file unlink task, determining whether a file identifier exists in the earlier filesystem representation and exists in the later filesystem representation, and in response to determining that the file identifier exists in the earlier filesystem representation and exists in the later filesystem representation, adding the file unlink task to a deferred unlink dataset, and in response to determining that the file identifier exists in the earlier filesystem representation and does not exist in the later filesystem representation, performing the file unlink task.

Figure 9:
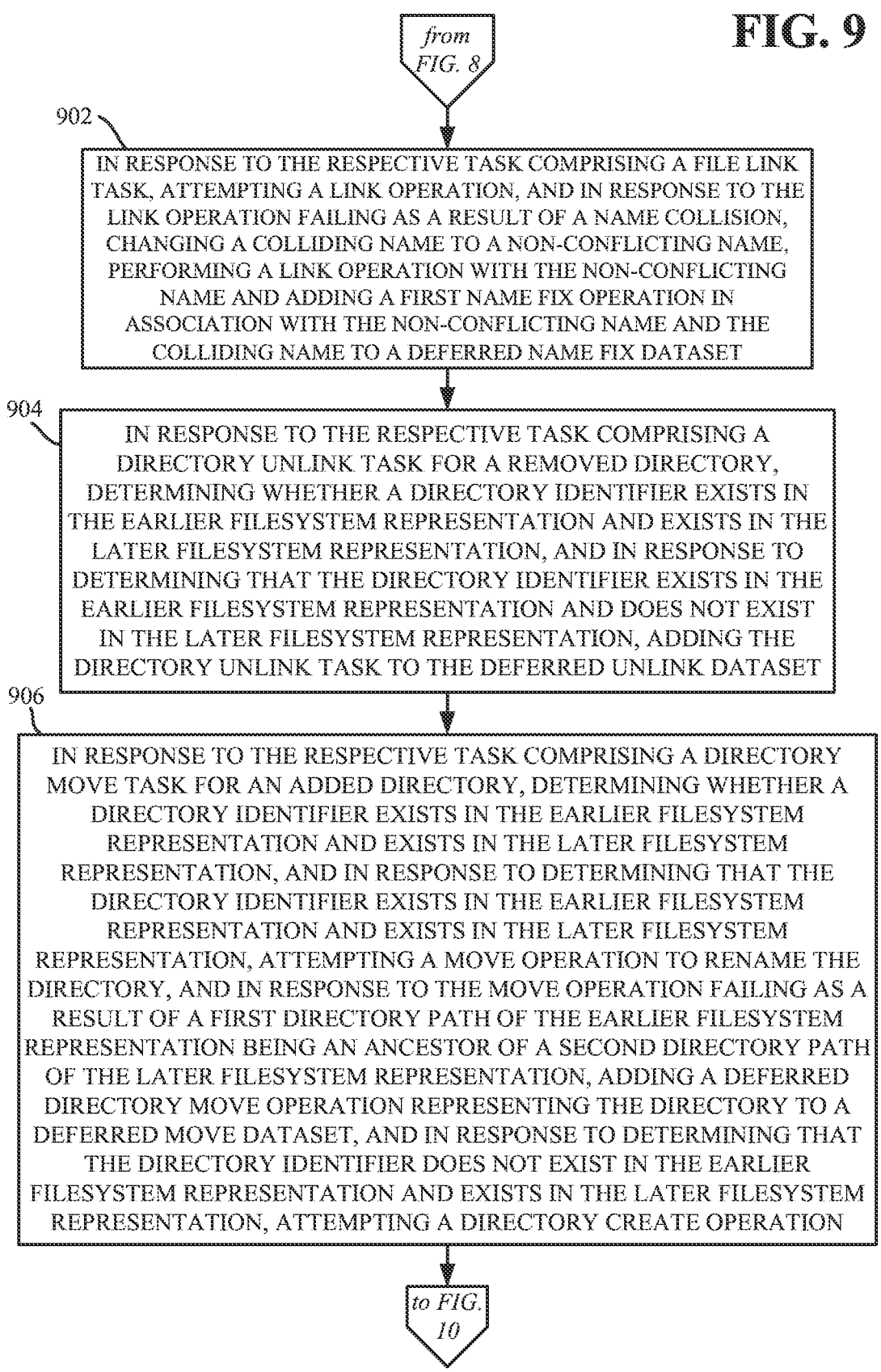

Example operation 902 of FIG. 9 represents, in response to the respective task comprising a file link task, attempting a link operation, and in response to the respective task comprising a file link task, attempting a link operation, and in response to the link operation failing as a result of a name collision, renaming a colliding name to a non-conflicting name, performing a link operation with the non-conflicting name, and adding a first name fix operation in association with the non-conflicting name and the colliding name to a deferred name fix dataset. Example operation 904 represents, in response to the respective task comprising a directory unlink task for a removed directory, determining whether a directory identifier exists in the earlier filesystem representation and exists in the later filesystem representation, and in response to determining that the directory identifier exists in the earlier filesystem representation and does not exist in the later filesystem representation, adding the directory unlink task to the deferred unlink dataset. Example operation 906 represents, in response to the respective task comprising a directory move task for an added directory, determining whether a directory identifier exists in the earlier filesystem representation and exists in the later filesystem representation, and in response to determining that the directory identifier exists in the earlier filesystem representation and exists in the later filesystem representation, attempting a move operation to rename the directory, and in response to the move operation failing as a result of a first directory path of the earlier filesystem representation being an ancestor of a second directory path of the later filesystem representation, adding a deferred directory move operation representing the directory to a deferred move dataset, and in response to determining that the directory identifier does not exist in the earlier filesystem representation and exists in the later filesystem representation, attempting a directory create operation.

Figure 10:
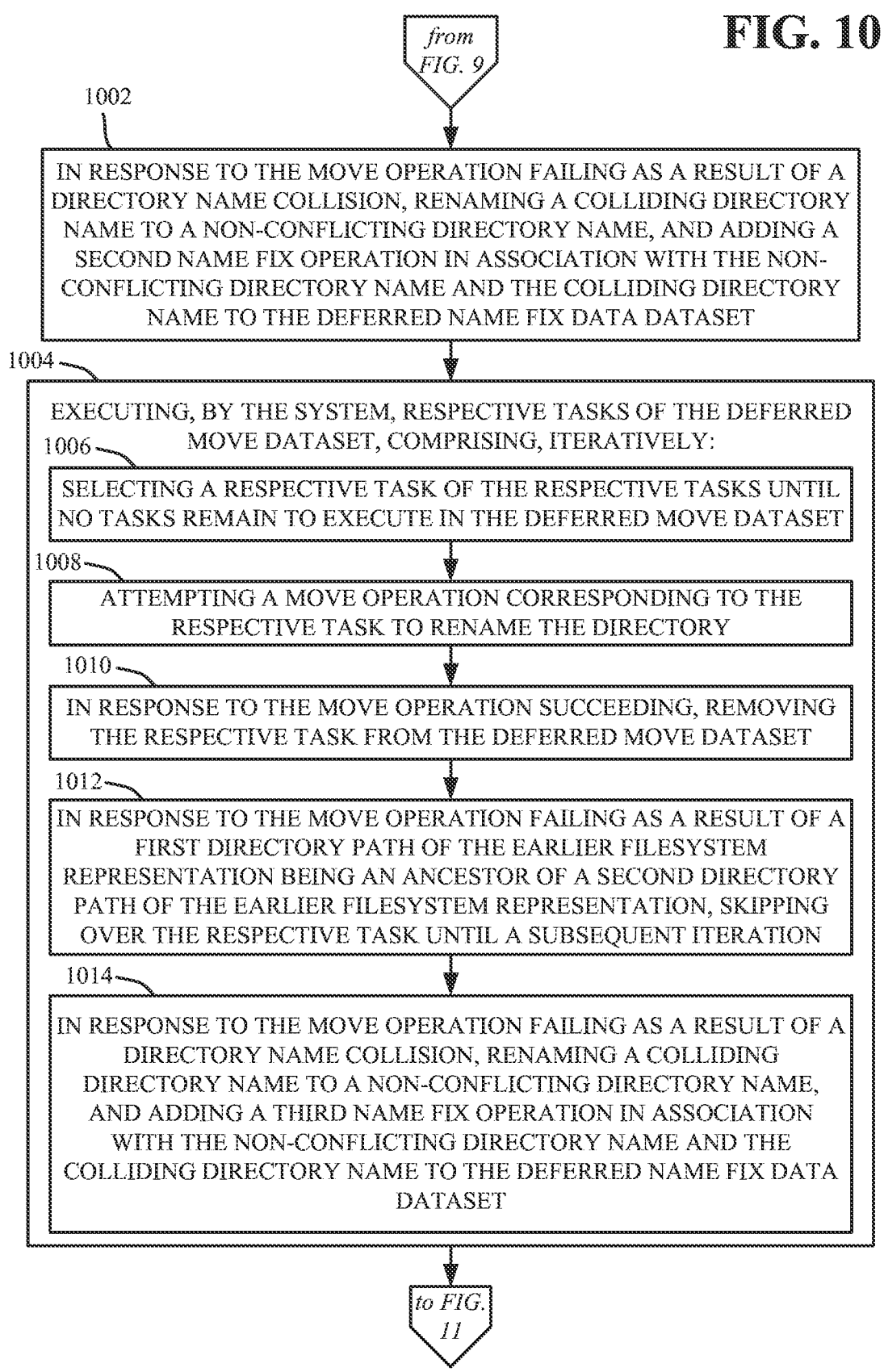

Example operation 1002 of FIG. 10 represents, in response to the directory create operation or the directory move operation failing as a result of a directory name collision, renaming a colliding directory name to a non-conflicting directory name, and adding a second name fix operation in association with the non-conflicting directory name and the colliding directory name to the deferred name fix dataset. Example operation 1004 of FIG. 10 represents executing, by the system, respective tasks of the deferred move dataset, comprising, iteratively example operations 1004-1014. Example operation 1006 of FIG. 10 represents selecting a respective task of the respective tasks until no tasks remain to execute in the deferred move dataset. Example operation 1008 of FIG. 10 represents attempting a move operation corresponding to the respective task to rename the directory. Example operation 1010 of FIG. 10 represents, in response to the move operation succeeding, removing the respective task from the deferred move dataset. Example operation 1012 of FIG. 10 represents, in response to the move operation failing as a result of a first directory path of the earlier filesystem representation being an ancestor of a second directory path of the earlier filesystem representation, skipping over the respective task until a subsequent iteration. Example operation 1014 of FIG. 10 represents, in response to the move operation failing as a result of a directory name collision, renaming a colliding directory name to a non-conflicting directory name, and adding a third name fix operation in association with the non-conflicting directory name and the colliding directory name to the deferred name fix dataset.

Figure 11:
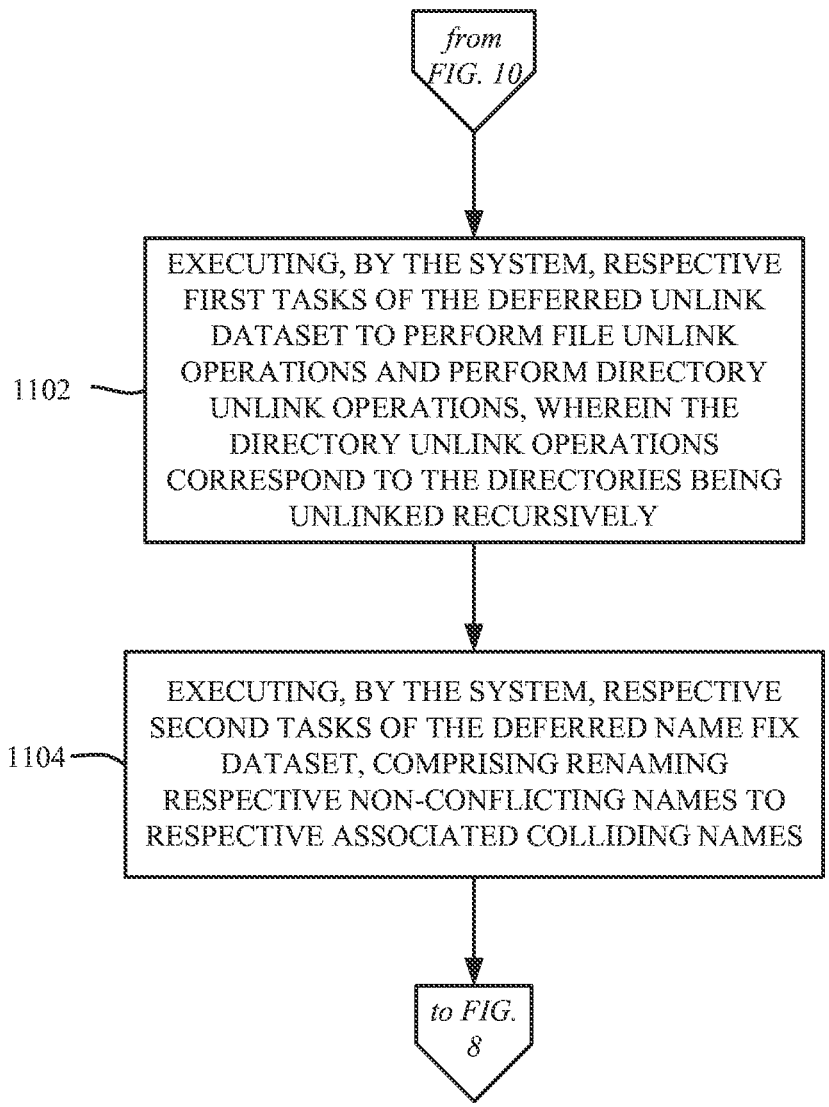

Example operation 1102 of FIG. 11 represents executing, by the system, respective first tasks of the deferred unlink dataset to perform file unlink operations and perform directory unlink operations, wherein the directory unlink operations correspond to the directories being unlinked recursively. Example operation 1104 represents executing, by the system, respective second tasks of the deferred name fix dataset, comprising renaming respective non-conflicting names to respective associated colliding names.

Executing the deferred move dataset can be performed prior to the executing of the deferred unlink dataset.

Executing the deferred move dataset can be performed prior to the executing of the deferred unlink dataset, and wherein the executing of the deferred unlink dataset is performed prior to the executing of the deferred name fix dataset.

Figure 12:
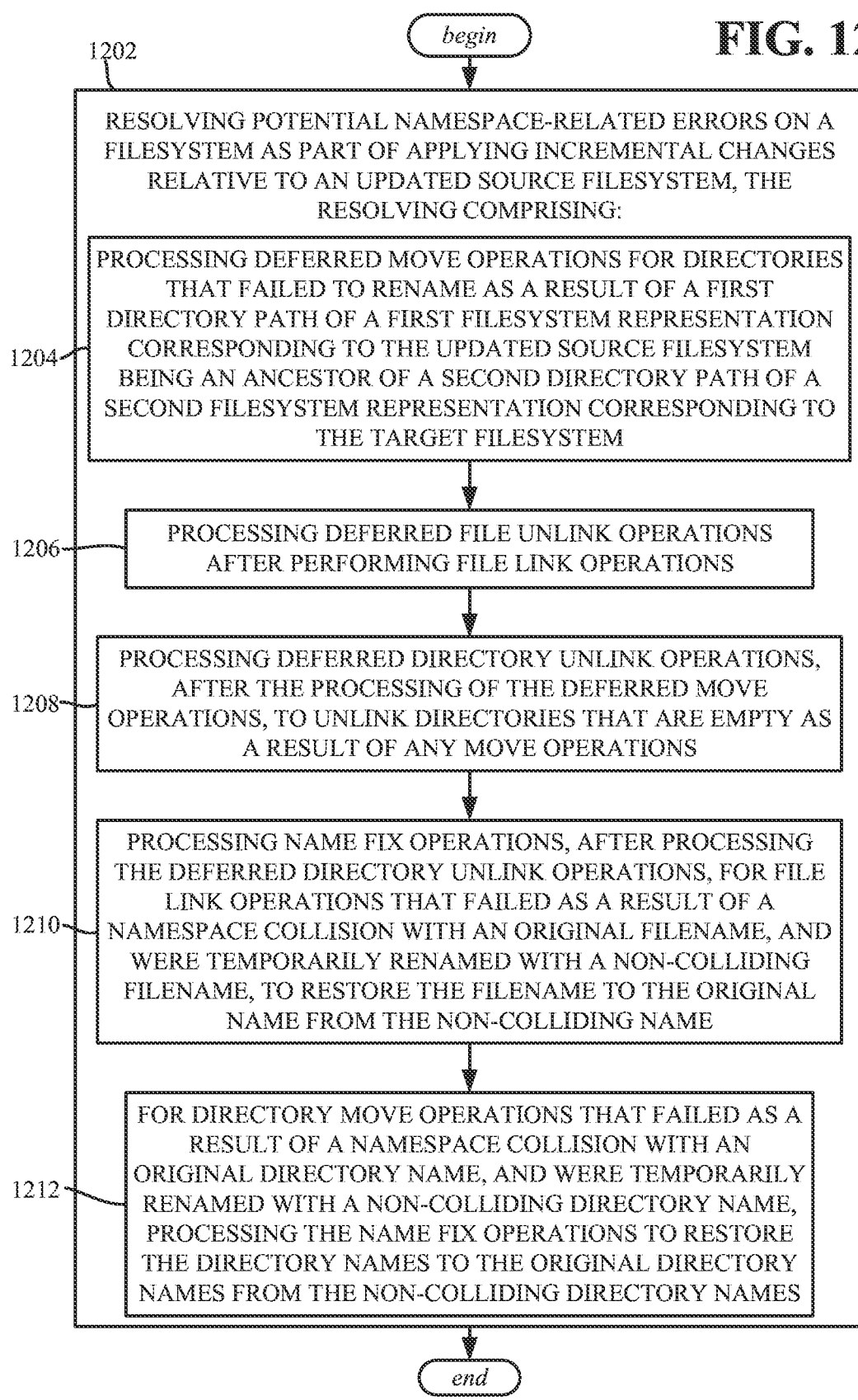
FIG. 12 is a flow diagram of example operations for resolving potential namespace-related errors on a filesystem as part of applying incremental changes based on an updated source filesystem, in accordance with various aspects and implementations of the subject disclosure.

FIG. 12 summarizes various example operations, e.g., corresponding to a machine-readable medium, comprising executable instructions that, when executed by a processor, facilitate performance of operations. Example operation 1202 represents resolving potential namespace-related errors on a target filesystem as part of applying incremental changes relative to an updated source filesystem, the resolving can include operations 1204-1212. Example operation 1204 represents processing deferred move operations for directories that failed to rename as a result of a first directory path of a first filesystem representation corresponding to the updated source filesystem being an ancestor of a second directory path of a second filesystem representation corresponding to the target filesystem. Example operation 1206 represents processing deferred file unlink operations after performing file link operations. Example operation 1208 represents processing deferred directory unlink operations, after the processing of the deferred move operations, to unlink directories that are empty as a result of any move operations. Example operation 1210 represents processing name fix operations, after processing the deferred directory unlink operations, for file link operations that failed as a result of a namespace collision with an original filename, and were temporarily renamed with a non-colliding filename, to restore the filename to the original name from the non-colliding name. Example operation 1212 represents, for directory move operations that failed as a result of a namespace collision with an original directory name, and were temporarily renamed with a non-colliding directory name, processing the name fix operations to restore the directory names to the original directory names from the non-colliding directory names.

Processing the deferred move operations can result in a directory namespace collision, and further operations can include renaming the directory name from an original, colliding directory name to a non-colliding directory name, and generating a fourth name fix operation for subsequent restoring of the original name.

The deferred move operations can be maintained in a deferred move dataset, and processing the deferred move operations can include, in one or more iterations, selecting a deferred move operation, attempting the deferred move operation, in response to the deferred move operation succeeding, removing the deferred move operation from the deferred move dataset, and in response to the move operation failing as a result of a first directory path represented in the first filesystem representation being an ancestor of a second directory path represented in the second filesystem representation, skipping over the deferred move operation to leave the deferred move operation in the deferred move dataset for at least one subsequent iteration until no deferred move operations remain in the deferred move dataset for processing.

As can be seen, the technology described herein resolves namespace collisions as part of an incremental namespace replication. By deferring certain operations, and temporarily using unique names for conflicting names, the issues that otherwise arise when namespace changes are applied to a target system are avoided. The technology described herein operates without the use of temporary directory and/or workarounds, which results in noticeable performance improvement.

Figure 13:
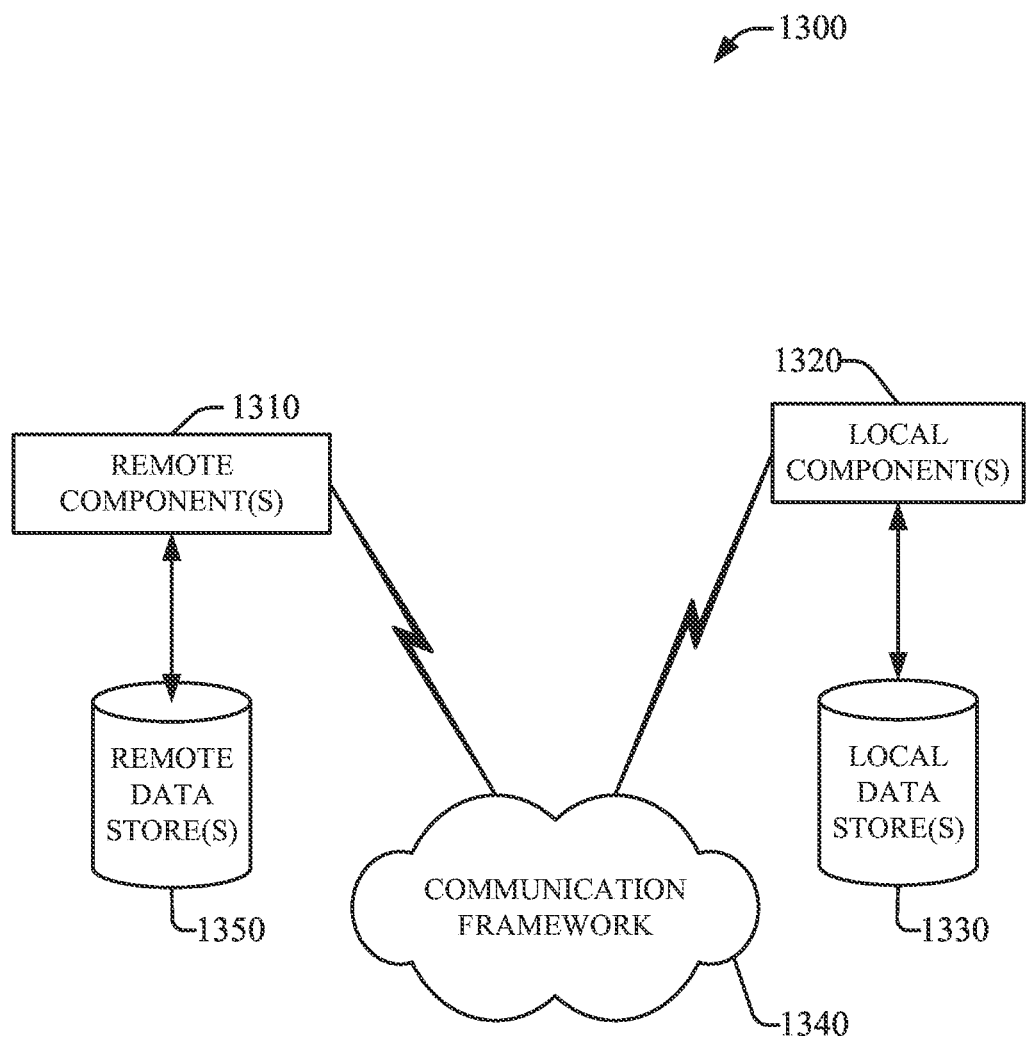
FIG. 13 is a block diagram representing an example computing environment into which aspects of the subject matter described herein may be incorporated.

FIG. 13 is a schematic block diagram of a computing environment 1300 with which the disclosed subject matter can interact. The system 1300 comprises one or more remote component(s) 1310. The remote component(s) 1310 can be hardware and/or software (e.g., threads, processes, computing devices). In some embodiments, remote component(s) 1310 can be a distributed computer system, connected to a local automatic scaling component and/or programs that use the resources of a distributed computer system, via communication framework 1340. Communication framework 1340 can comprise wired network devices, wireless network devices, mobile devices, wearable devices, radio access network devices, gateway devices, femtocell devices, servers, etc.

The system 1300 also comprises one or more local component(s) 1320. The local component(s) 1320 can be hardware and/or software (e.g., threads, processes, computing devices). In some embodiments, local component(s) 1320 can comprise an automatic scaling component and/or programs that communicate/use the remote resources 1310, etc., connected to a remotely located distributed computing system via communication framework 1340.

One possible communication between a remote component(s) 1310 and a local component(s) 1320 can be in the form of a data packet adapted to be transmitted between two or more computer processes. Another possible communication between a remote component(s) 1310 and a local component(s) 1320 can be in the form of circuit-switched data adapted to be transmitted between two or more computer processes in radio time slots. The system 1300 comprises a communication framework 1340 that can be employed to facilitate communications between the remote component(s) 1310 and the local component(s) 1320, and can comprise an air interface, e.g., Uu interface of a UMTS network, via a long-term evolution (LTE) network, etc. Remote component(s) 1310 can be operably connected to one or more remote data store(s) 1350, such as a hard drive, solid state drive, SIM card, device memory, etc., that can be employed to store information on the remote component(s) 1310 side of communication framework 1340. Similarly, local component(s) 1320 can be operably connected to one or more local data store(s) 1330, that can be employed to store information on the local component(s) 1320 side of communication framework 1340.

Figure 14:
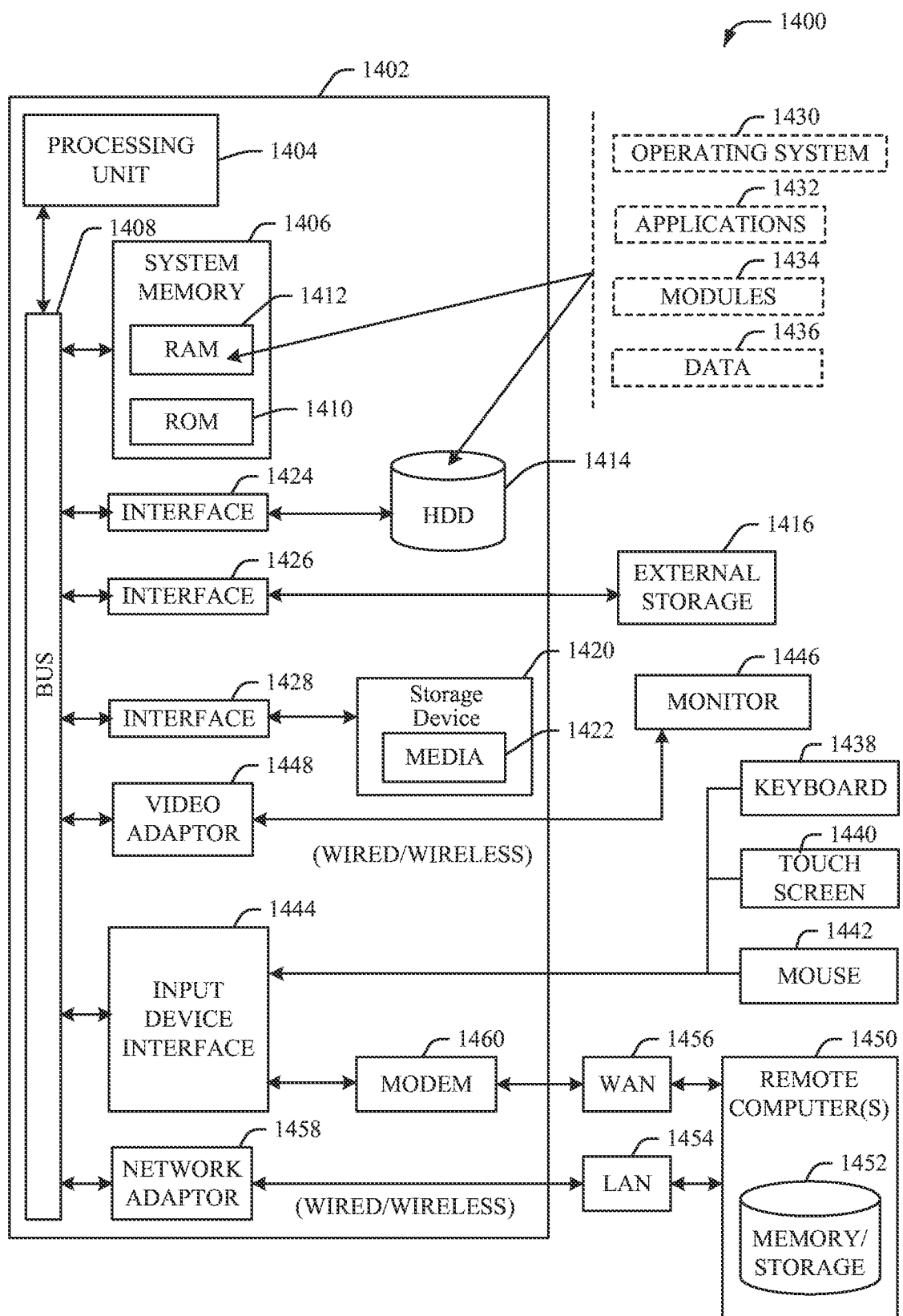
FIG. 14 depicts an example schematic block diagram of a computing environment with which the disclosed subject matter can interact/be implemented at least in part, in accordance with various aspects and implementations of the subject disclosure.

In order to provide additional context for various embodiments described herein, FIG. 14 and the following discussion are intended to provide a brief, general description of a suitable computing environment 1400 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), and can include one or more external storage devices 1416 (e.g., a magnetic floppy disk drive (FDD) 1416, a memory stick or flash drive reader, a memory card reader, etc.). While the internal HDD 1414 is illustrated as located within the computer 1402, the internal HDD 1414 can also be configured for external use in a suitable chassis (not shown). Additionally, while not shown in environment 1400, a solid state drive (SSD) could be used in addition to, or in place of, an HDD 1414.

Other internal or external storage can include at least one other storage device 1420 with storage media 1422 (e.g., a solid state storage device, a nonvolatile memory device, and/or an optical disk drive that can read or write from removable media such as a CD-ROM disc, a DVD, a BD, etc.). The external storage 1416 can be facilitated by a network virtual machine. The HDD 1414, external storage device(s) 1416 and storage device (e.g., drive) 1420 can be connected to the system bus 1408 by an HDD interface 1424, an external storage interface 1426 and a drive interface 1428, respectively.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1494 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are examples and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "of" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. Network equipment, comprising:
a processor; and
a memory that stores executable instructions that, when executed by the processor, facilitate performance of operations, the operations comprising:
processing comparison results between a first filesystem representation and a second filesystem representation, the comparison results comprising file namespace changes corresponding to file link operations and file unlink operations, and directory namespace changes corresponding to directory unlink operations and directory move operations, the processing comprising:
determining, for the file unlink operations of files of the file namespace changes and the directory unlink operations of directories of the directory namespace changes, whether any file identifier in the first filesystem representation exists in the second filesystem representation;
in response to determining that a file identifier for a directory in the first filesystem representation does not exist in the second filesystem representation, adding an unlink operation for the file identifier for the directory to a deferred unlink dataset,
in response to determining that a file identifier for a file in the first filesystem representation does not exist in the second filesystem representation, performing the unlink operation for the file identifier for the file, and
in response to determining that a file identifier in the first filesystem representation exists in the second filesystem representation, deferring the unlink operation, comprising adding an unlink operation for the file identifier in the first filesystem representation to the deferred unlink dataset;

performing the file link operations of files of the file namespace changes, comprising, for any file link operation that fails as a result of a namespace collision, temporarily renaming a colliding filename for the file link operation to a non-colliding filename, and maintaining first data representing the non-colliding filename in association with the colliding filename;

performing the directory move operations of the directories of the directory namespace changes, comprising for any directory move operation that fails as a result of a first directory path represented in the first filesystem representation being an ancestor of a second directory path represented in the second filesystem representation, deferring the move operation, comprising maintaining second data representing the deferred move operation, and for any directory move operation that fails as a result of a namespace collision, temporarily renaming a colliding directory name for the move operation to a non-colliding directory name, and maintaining third data representing the non-colliding directory name in association with the colliding directory name;

performing any deferred move operation that is deferred, and for any deferred move operation that fails as a result of a namespace collision, temporarily renaming the colliding directory name to a non-colliding directory name, re-performing the move operation on the non-colliding directory name, and further maintaining the third data representing the non-colliding directory name in association with the colliding directory name;

performing any deferred unlink operations; and performing any name fix operations, comprising renaming any temporarily renamed non-conflicting filename to the associated previously colliding filename, and renaming any temporarily renamed non-conflicting directory name to the associated previously colliding directory name.

2. The network equipment of claim 1, wherein the maintaining of the second data representing the deferred move operation comprises maintaining a deferred move dataset corresponding to any deferred move operation, and wherein the performing of any deferred move operation that is deferred comprises:

attempting the deferred move operation, in response to the deferred move operation succeeding, removing the deferred move operation from the deferred move dataset, in response to the deferred move operation failing as the result of the first directory path represented in the first filesystem representation being the ancestor of the second directory path represented in the second filesystem representation, skipping over the deferred move operation to leave the deferred move operation in the deferred move dataset, and looping back to reattempt the deferred move operation in a subsequent iteration over the deferred move dataset until no deferred move operations remain to be processed in the deferred move dataset.

3. The network equipment of claim 1, wherein the first filesystem representation represents a source filesystem being in a first state, wherein the second filesystem representation represents the source filesystem being in a second state, and wherein the second state is an updated state relative to the first state.

4. The network equipment of claim 3, wherein changes to the source filesystem corresponding to the second state relative to the first state are copied via an incremental copy to a target filesystem to update the target filesystem from the first state to the second state.

5. The network equipment of claim 1, wherein at least one file identifier for an unlink operation represents a directory, and wherein at least one other file identifier for another unlink operation represents a file.

6. The network equipment of claim 5, wherein any move operation that is deferred is performed on a target filesystem associated with the move operation, and wherein any unlink operation that is deferred is performed on a target filesystem associated with the unlink operation.

7. The network equipment of claim 1, wherein at least one of: the performing of the file unlink operations, or the performing of the directory unlink operations, for any directory that is empty as a result of any move operation, are performed via at least one of: parallelized operations or multiple background operations.

8. The network equipment of claim 1, wherein the first filesystem representation comprises a first filesystem snapshot and the second filesystem representation comprises a second filesystem snapshot obtained at a later point in time relative to the first filesystem snapshot.

9. The network equipment of claim 1, wherein the first filesystem representation represents a filesystem at a first storage cluster, and wherein the second filesystem representation represents a filesystem at a second storage cluster.

10. The network equipment of claim 1, wherein the performing of any deferred move operation that is deferred is performed prior to the performing of the file unlink operations and prior to the performing of the directory unlink operations, for any directory that is empty as a result of a move operation.

11. The network equipment of claim 1, wherein the performing of any deferred move operation that is deferred is performed prior to the performing of any of the name fix operations.

12. The network equipment of claim 1, wherein the performing of the file unlink operations and the performing of the directory unlink operation for any directory that is empty as a result of any move operation executing on the deferred unlink dataset is performed prior to the performing of any of the name fix operations.

13. The network equipment of claim 1, wherein the performing of any deferred move operation that is deferred is performed prior to the performing of the file unlink operations and prior to the performing of the directory unlink operation for any directory that is empty as a result of any move operation with respect to the deferred unlink dataset, and wherein the performing of the file unlink operations and the performing of the directory unlink operations, for any directory that is empty as a result of any move operation, are performed prior to the performing of any of the name fix operations.

14. The network equipment of claim 1, wherein the performing of the directory unlink operation for any directory that is empty as a result of any move operation comprises performing a recursive unlink operation.

15. A method, comprising:

obtaining, by a system comprising a processor, comparison results of an earlier filesystem representation and a later filesystem representation that comprises changed files and changed directories relative to the earlier filesystem representation, the comparison results corresponding to respective tasks representing respective file identifiers for namespace changes to files, and representing respective directory identifiers for namespace changes to directories;

processing, by the system, the respective tasks, the processing comprising:

selecting a respective task from the respective tasks;

in response to the respective task comprising a file unlink task, determining whether a file identifier exists in the earlier filesystem representation and exists in the later filesystem representation, and in response to determining that the file identifier exists in the earlier filesystem representation and exists in the later filesystem representation, adding the file unlink task to a deferred unlink dataset, and in response to determining that the file identifier exists in the earlier filesystem representation and does not exist in the later filesystem representation, performing the file unlink task;

in response to the respective task comprising a file link task, attempting a link operation, and in response to the link operation failing as a result of a name collision, renaming a colliding name to a non-conflicting name, performing another link operation with the non-conflicting name, and adding a first name fix operation in association with the non-conflicting name and the colliding name to a deferred name fix dataset;

in response to the respective task comprising a directory unlink task for a removed directory, determining whether a directory identifier associated with the removed directory exists in the earlier filesystem representation and exists in the later filesystem representation, and in response to determining that the directory identifier associated with the removed directory exists in the earlier filesystem representation and exists in the later filesystem representation, adding the directory unlink task to the deferred unlink dataset;

in response to the respective task comprising a directory move task for an added directory, determining whether a directory identifier associated with the added directory exists in the earlier filesystem representation and exists in the later filesystem representation, and in response to determining that the directory identifier associated with the added directory exists in the earlier filesystem representation and exists in the later filesystem representation, attempting a move operation to rename the added directory, and in response to the move operation failing as a result of a first directory path of the earlier filesystem representation being an ancestor of a second directory path of the later filesystem representation, adding a deferred directory move operation representing the added directory to a deferred move dataset, and in response to determining that the directory identifier associated with the added directory does not exist in the earlier filesystem representation and exists in the later filesystem representation, attempting a directory create operation;

in response to the directory create operation or the directory move operation failing as a result of a directory name collision, renaming a colliding directory name to a non-conflicting directory name, and adding a second name fix operation in association with the non-conflicting directory name and the colliding directory name to the deferred name fix dataset;

executing, by the system, respective tasks of the deferred move dataset, comprising, iteratively:

selecting a respective task of the respective tasks until no tasks remain to execute in the deferred move dataset, attempting a move operation corresponding to the respective task to rename the directory, in response to the move operation succeeding, removing the respective task from the deferred move dataset, in response to the move operation failing as the result of the first directory path of the earlier filesystem representation being the ancestor of the second directory path of the earlier filesystem representation, skipping over the respective task until a subsequent iteration, in response to the move operation failing as the result of the directory name collision, renaming the colliding directory name to the non-conflicting directory name, and adding a third name fix operation in association with the non-conflicting directory name and the colliding directory name to the deferred name fix dataset;

executing, by the system, respective first tasks of the deferred unlink dataset to perform file unlink operations and perform directory unlink operations, wherein the directory unlink operations correspond to the directories being unlinked recursively; and executing, by the system, respective second tasks of the deferred name fix dataset, comprising renaming respective non-conflicting names to respective associated colliding names.

16. The method of claim 15, wherein the executing of the deferred move dataset is performed prior to the executing of the deferred unlink dataset.

17. The method of claim 15, wherein the executing of the deferred move dataset is performed prior to the executing of the deferred unlink dataset, and wherein the executing of the deferred unlink dataset is performed prior to the executing of the deferred name fix dataset.

18. A non-transitory machine-readable medium, comprising executable instructions that, when executed by a processor, facilitate performance of operations, the operations comprising:

resolving namespace-related errors on a filesystem as part of applying incremental changes relative to an updated source filesystem, the resolving comprising:

processing deferred move operations for directories that failed to rename as a result of a first directory path of a first filesystem representation corresponding to the updated source filesystem being an ancestor of a second directory path of a second filesystem representation corresponding to the filesystem;

processing deferred file unlink operations after performing file link operations;

processing deferred directory unlink operations, after the processing of the deferred move operations, to unlink directories that are empty as a result of any move operations;

processing name fix operations, after processing the deferred directory unlink operations, for file link operations that respectively failed as a result of a namespace collision with an original filename associated with a file link operation, and were temporarily renamed with a non-colliding filename associated with the file link operation, to restore the original filename associated with the file link operation from the non-colliding filename associated with the file link operation; and for directory move operations that respectively failed as a result of a namespace collision with an original directory name associated with a directory move operation, and were temporarily renamed with a non-colliding directory name associated with the directory move operation, processing the name fix operations to restore the original directory name associated with the directory move operation from the non-colliding directory name associated with the directory move operation.

19. The non-transitory machine-readable medium of claim 18, wherein the processing of the deferred move operations results in a directory namespace collision, and wherein the operations further comprise renaming an original colliding directory name associated with the directory namespace collision to a non-colliding directory name, and generating a fourth name fix operation for subsequent restoring of the original colliding directory name.

20. The non-transitory machine-readable medium of claim 18, wherein the deferred move operations are maintained in a deferred move dataset, and wherein the processing of the deferred move operations comprises, in one or more iterations, selecting a deferred move operation, attempting the deferred move operation, in response to the deferred move operation succeeding, removing the deferred move operation from the deferred move dataset, and in response to the deferred move operation failing as the result of the first directory path represented in the first filesystem representation being the ancestor of the second directory path represented in the second filesystem representation, skipping over the deferred move operation to leave the deferred move operation in the deferred move dataset for at least one subsequent iteration until no deferred move operations remain in the deferred move dataset for processing.

* * * * *